(12) United States Patent
Samuelsson

(10) Patent No.: US 6,310,573 B1
(45) Date of Patent: Oct. 30, 2001

(54) VELOCITY CALCULATION

(75) Inventor: Arne Samuelsson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/099,324

(22) Filed: Jun. 18, 1998

(30) Foreign Application Priority Data

Jun. 18, 1997 (SE) .................................................... 9702318

(51) Int. Cl.[7] .................................................... G01S 13/58
(52) U.S. Cl. ......................... 342/104; 342/115; 342/116
(58) Field of Search .................. 342/104, 115, 342/116

(56) References Cited

U.S. PATENT DOCUMENTS

| 5,239,667 | | 8/1993 | Kanai ..................................... 455/10 |
| 5,262,785 | * | 11/1993 | Silverstein et al. .................. 342/162 |
| 5,434,570 | * | 7/1995 | Wurman ................................ 342/26 |
| 5,594,450 | * | 1/1997 | Schober ............................... 342/159 |
| 5,640,146 | * | 6/1997 | Campna, Jr. .......................... 340/573 |

FOREIGN PATENT DOCUMENTS

| 97/23785 | 7/1997 | (AU) . |
| 2056914 | 6/1992 | (CA) . |
| 35 39 105 | 5/1990 | (DE) . |

OTHER PUBLICATIONS

Giancristofaro, D., "First European Personal and Mobile Communications Conference", *Fondazione Ugo Bordoni*, 1995, INSPEC Abstract No. B9604–6250F–170.

* cited by examiner

Primary Examiner—John B. Sotomayor
(74) Attorney, Agent, or Firm—Burns, Doane, Swecker & Mathis, L.L.P.

(57) ABSTRACT

Method and device for calculating a velocity of a moving transmitter using Rayleigh-fading of a received radio signal are presented. The method includes the step of making at least two parallel calculations of at least two respective values using the received radio signal. The at least two respective values resulting from the calculations are then used as the basis for making a decision. The decision results in an optimal value for calculating the velocity of the moving transmitter being chosen from among the at least two respective values. Each of the at least two parallel calculations is carried out by respective devices each having at least one filter and at least one level crossing counter.

12 Claims, 4 Drawing Sheets

VELOCITY CALCULATION

This application claims priority under 35 U.S.C. §§119 and/or 365 to 9702318-8 filed in Sweden on Jun. 18. 1997; the entire content of which is hereby incorporated by reference.

TECHNICAL FIELD OF THE INVENTION

The present invention relates to a device and a method for calculating the velocity of a moving radio transmitter by means of Rayleigh-fading.

TECHNICAL BACKGROUND OF THE INVENTION

The area which is covered by a cellular telephony system is divided into so-called cells. In each cell there is a base-station, which handles all communication to and from all cellular telephones in the cell. When a cellular telephone crosses the border between two cells, control of the cell phone's calls is transferred to the base-station of the new cell. In order to facilitate this transfer, so-called hand-off, it is of great interest to know the speed at which the cellular phone is moving.

In, for example, urban areas and other areas with a high call density, it might be desirable to make the cells smaller, since smaller cells will lead to an increase in the amount of base-stations within the area in question. The reason for wanting to increase the amount of base-stations is that this will increase the amount of calls which the system is capable of handling within the area in question.

In areas with many small cells and a high concentration of base-stations, there will be an especially large need to handle hand-off in an optimal manner. In such areas, it will in other words be especially important to know the speed with which the cellular telephone is moving. It is, for example, possible to make a decision not to transfer control of the calls of a cellular telephone to the base-station of a cell if it is known that the cellular phone due to a high speed of motion will not be in that cell for an extended period of time.

The radio signal which is received from the cellular telephone can be attenuated due to multipath propagation, so-called fading. The kind of fading which is practically always present in urban areas is so-called Rayleigh-fading. Rayleigh-fading causes periodical attenuations in the received signal, with the distance in time between the attenuations being dependent on the speed at which the cellular telephone is moving.

The connection between Rayleigh-fading and the speed of motion of the cellular telephone in other words makes it possible to determine the speed at which the cellular phone is moving by looking at the frequency with which the signal received from the cellular telephone falls below a certain level.

Canadian patent CA 2 056 914 discloses a device which works according to the above-mentioned principle. A problem with this device is that it seems to be suited for an ideal system, in which the received signal is strong and without noise. However, in cellular telephony systems, the received signal is often weak and contains a great deal of interference. The interference can be either other radio transmissions or receiver interference. This interference can cause "false" level crossings. Using the device of CA 2 056 914, it can thus be difficult to determine the speed of motion of a cellular phone with useful significance.

SUMMARY OF THE INVENTION

The purpose of the present invention is to obtain a device and a method which can be used to determine the velocity with which a radio transmitter, for example a cellular telephone, is moving, by means of Rayleigh-fading. The device functions well even in the presence of noise and interference.

This purpose is achieved using a device which comprises a plurality of low-pass filters in parallel, which filters all have different cut-off frequencies. The signal in to all of the filters is the signal which Is received from the radio transmitter. Each filter is equipped with a so-called level crossing counter which counts the amount of times that the signal out from the filter crosses a certain reference level either in the positive or negative direction.

All of the level crossing counters are connected to a common decision device, a so-called selector block, which, using the output signals of the level crossing counters, chooses that filter which is optimal for the signal which is received at the moment.

The output signal which is chosen can then be used in order to determine the speed of motion of the radio transmitter.

The purpose of the invention is also obtained using a method which includes making at least two parallel computations of a value using the speed of motion of a radio transmitter. Using the result of the calculations, a decision is then made as to which of the results will be used for the velocity calculation.

BRIEF DESCRIPTION OF THE DRAWINGS

The invention will be described below in more detail, using examples of embodiments and with references to the appended drawings in which.

PREFERRED EMBODIMENTS

Figure 1:
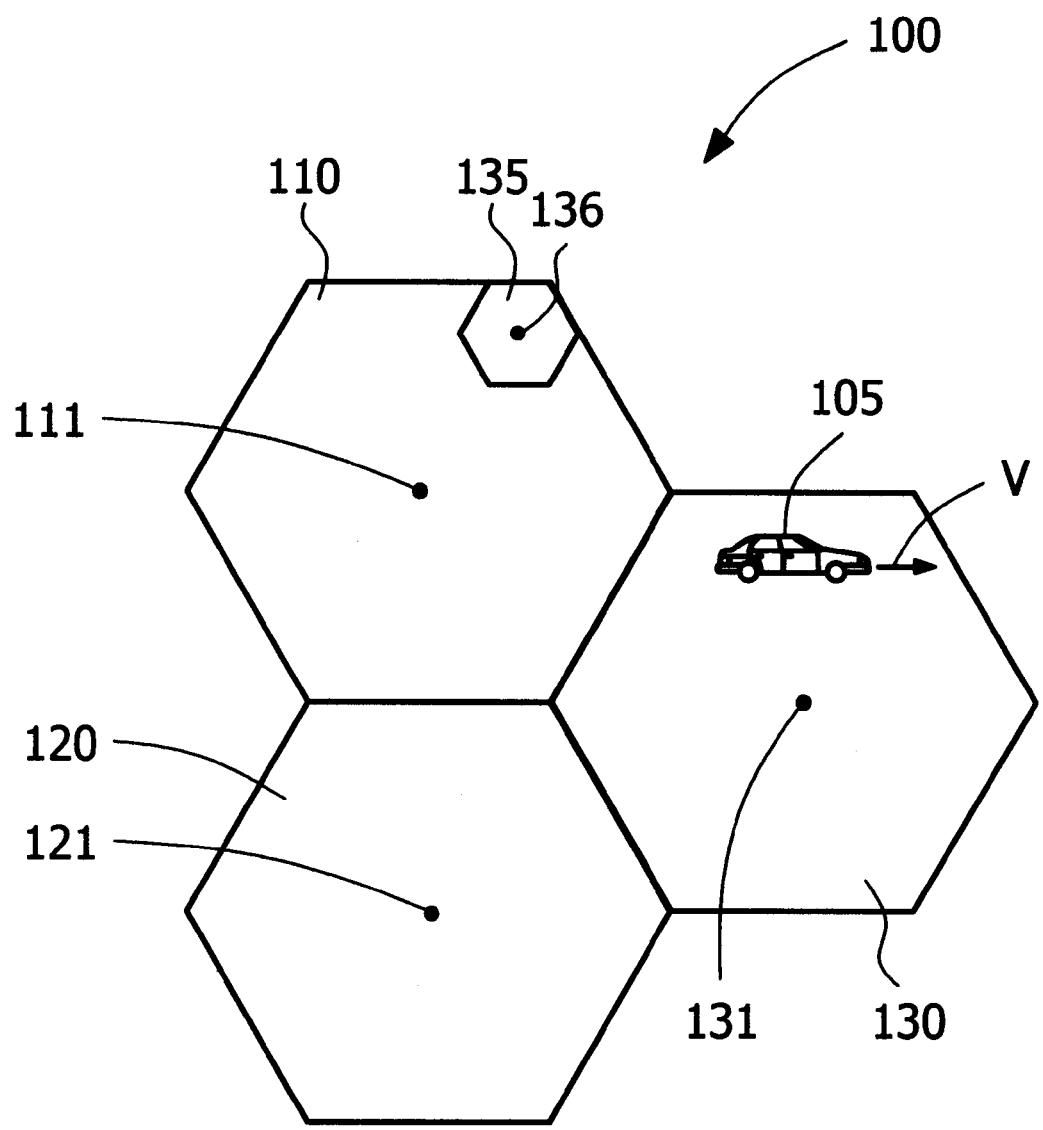
FIG. 1 schematically shows a subscriber in a cellular telephone system.

FIG. 1 shows a cellular telephony system 100. The cellular telephony system 100 is, as has been described above, divided into cells. The cells are usually of approximately the same size, but within a cell it is possible to arrange smaller cells in areas of especially high call density. The larger cells are then called macro-cells and the smaller cells are called micro-cells. FIG. 1 shows three macro-cells 110, 120, 130 where there in one of the macro-cells 110 is a micro cell 135.

In each cell 110, 120, 130, 135 there is a base-station 111, 121, 131, 136, which handles all the communication to and from all of the cellular phones in each cell.

In the cellular telephony system 100 of FIG. 1, there is a subscriber, a cellular telephone 105, which is located in the cell 130. All the communication to and from the cellular phone 105 is, in other words, handled by the base-station 131.

The cellular phone 105 of FIG. 1 is moving at a velocity v. The fact that the cellular phone 105 has a velocity relative to the base-station 131 causes the frequency at which the base-station 131 receives the signal from the cell phone 105 to be displaced relative to the frequency at which the signal was transmitted. This displacement in frequency is called doppler shift.

The cellular telephony system 100 of FIG. 1 is assumed to be located in an urban area, where so-called Rayleigh-fading is practically always present. This kind of fading, as mentioned earlier, causes attenuations in the signal, with the distance in time between the attenuations being proportional to the doppler shift of the received signal.

The relationship between the Rayleigh-fading and the doppler shift of the signal from the cell phone 105 can be expressed using the amount of times which the amplitude of the signal received from the cell phone 105 crosses a certain given reference level. Using this, the speed of motion of the cell phone 105 can be calculated.

The connection between Rayleigh-fading and doppler shift can mathematically be expressed in the following manner:

$$N_R = (2\pi)^{1/2} \cdot f_D \cdot S \cdot e^{(-S^2)} \quad (1)$$

where $N_R$=The amount of times which the reference level is crossed per time unit.

$f_D$=The doppler shift of the received signal.

S=The reference level divided by the RMS level of the received signal.

From expression (1) it can be seen that the reference level S which is used in the calculations can, in principle, be chosen arbitrarily, since the choice of S directly affects $N_R$. The reference level S is divided by the average value of the received signal during a certain period of time, with the average value being calculated according to the RMS method. The period of time used in this calculation is preferably the same as the time during which the velocity measurement according to the invention is carried out, and is, for example, in the order of size of 500–1000 ms.

From expression (1) it can further be seen that the amount of times $N_R$ which the reference level S is crossed by the signal is proportional to $f_D$, i.e. the doppler shift of the received signal. Using this, the speed of movement of the cell phone 105 can be calculated according to:

$$f_D = v_1 \frac{f}{c} \quad (2)$$

where c=the speed of light f=the transmission frequency of the cell phone.

Figure 2:
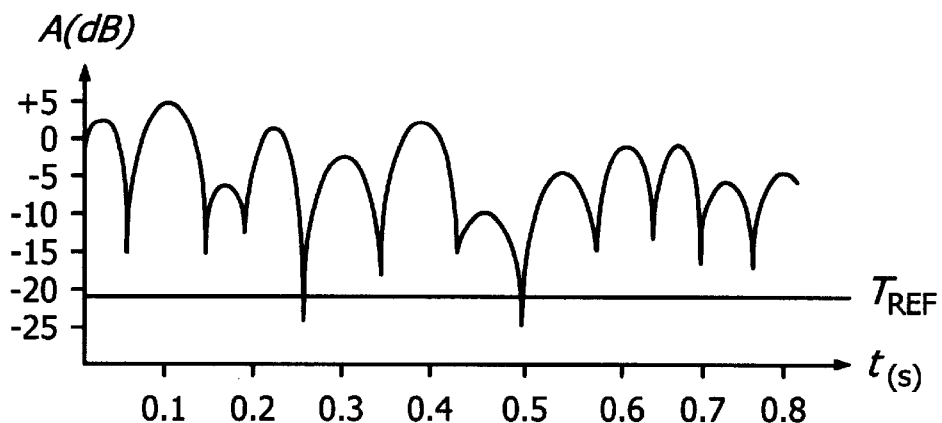
FIG. 2 shows the characteristics of an ideal noiseless signal which is exposed to Rayleigh-fading.

FIG. 2 shows a diagram of amplitude as a function of time of an ideal, and strong signal without interference, which is exposed to Rayleigh-fading. The figure also shows an imagined reference level $T_{REF}$.

Figure 3:
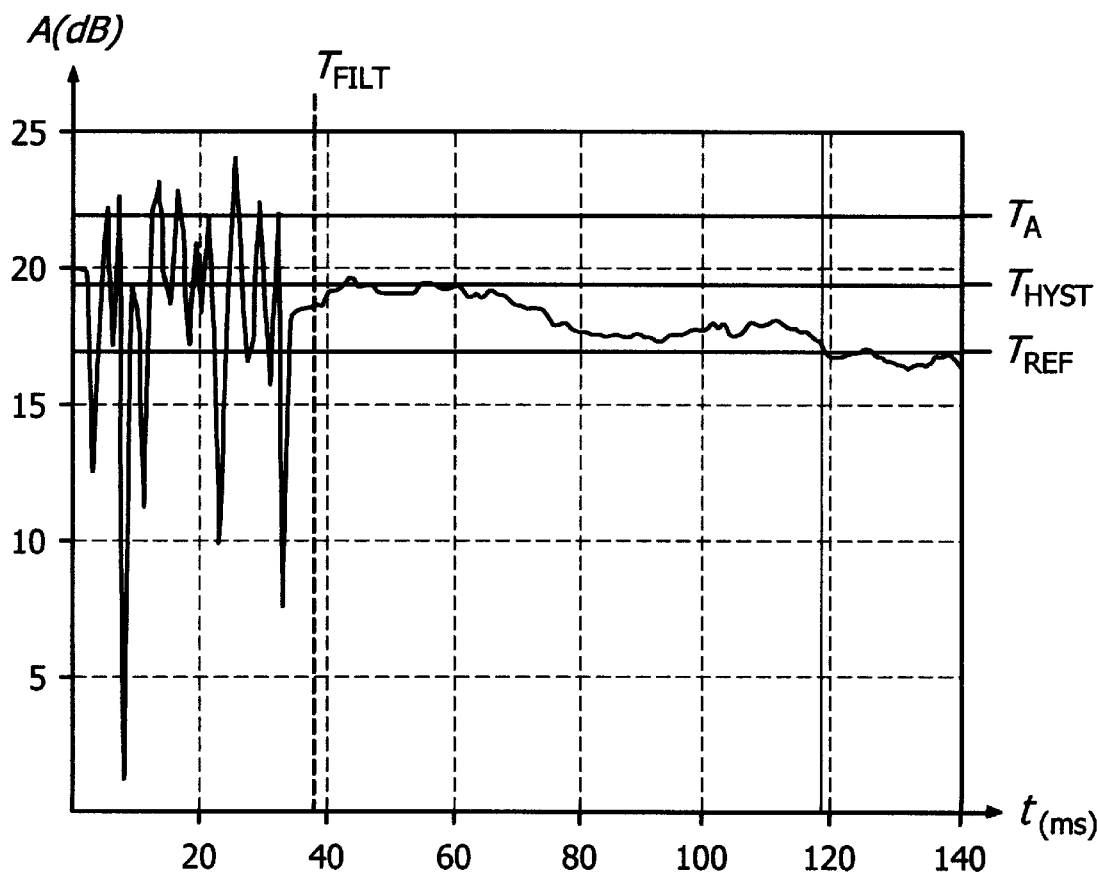
FIG. 3 shows the characteristics before and after filtering of a weak noisy signal which is exposed to Rayleigh-fading.

As a contrast to the ideal signal of FIG. 2, FIG. 3 shows a diagram of the amplitude as a function of time of a weak signal in an environment with interference. This signal is also exposed to Rayleigh-fading. To the left of the line $T_{filt}$, the signal is shown unfiltered, and to the right of the line the corresponding signal is shown filtered. The filter which has been used is a low-pass filter whose cut-off frequency is adjusted to the doppler shift $f_D$ of the received signal. A reference level $T_{REF}$ and the RMS mean value $T_A$ of the signal have been plotted in the diagram. It should be mentioned that the reference level S which has been used in expression (1) above corresponds to $T_{REF}$ divided by $T_A$.

As can be seen in the diagram of FIG. 3, the interferences cause the reference level $T_{REF}$ to be crossed more often than the crossings caused by the Rayleigh process. The filtered signal crosses the reference level only once, while the unfiltered signal exhibits a large amount of crossings of the reference level.

These "false" crossings will thus cause errors when calculating the speed of movement of the cell phone 105.

Figure 4:
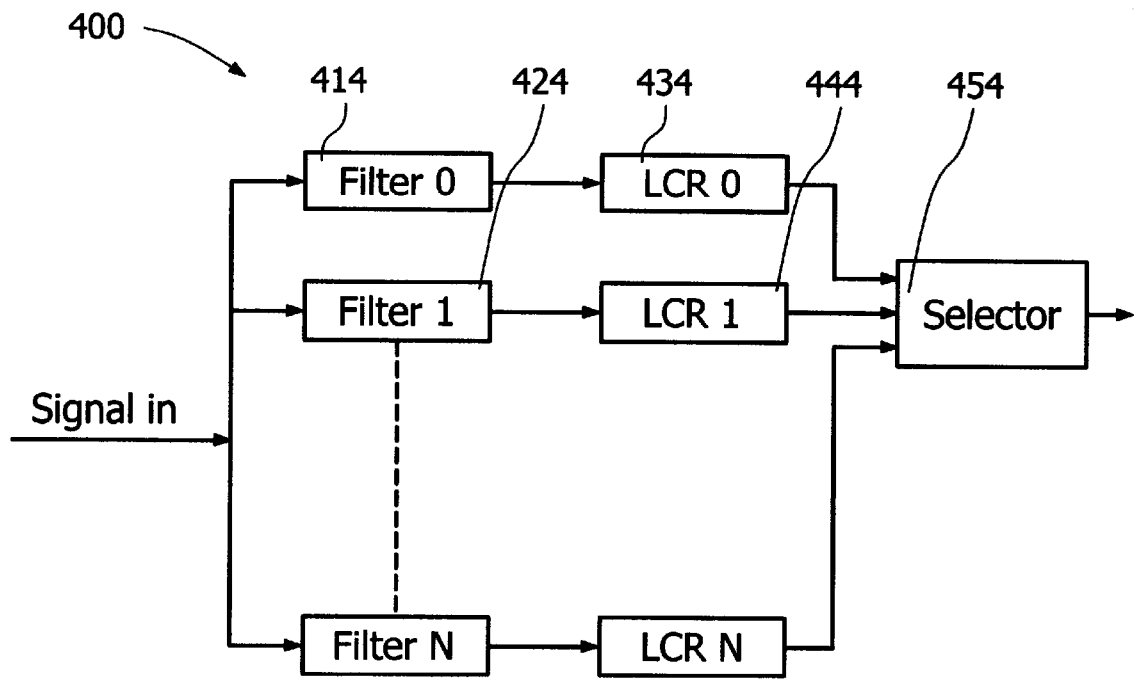
FIG. 4 shows a device according to the invention.

As explained above, the frequency spectrum of the received signal will vary depending on the speed of motion of the cell phone 105. The variation of the frequency spectrum of the received signals means that the problem of the weak and noisy signal of FIG. 3 cannot be solved with a design using only one filter. Such a solution would, in many situations, filter out components of the transmitted signal as well. This problem is solved according to the invention using an adaptive device, the principle construction of which is shown in FIG. 4.

Figure 5:
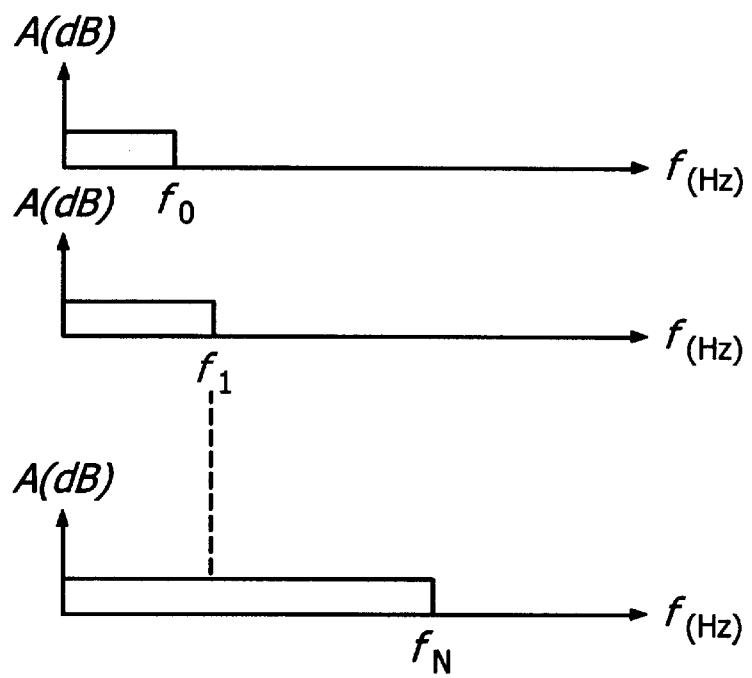
FIG. 5 shows the ideal filter characteristics of a plurality of low-pass filters.

The device 400 according to the invention comprises a plurality N of filters 414, 424 in parallel. All of the filters 414, 424 are low-pass filters with different cut-off frequencies, where the cut-off frequency $f_N$ of filter n (0<n<N) is greater than the cut-off frequency $f_{n-1}$ of filter n–1, which in turn has a higher cut-off frequency than filter n–2 and so on. This principle, N low-pass filters with successively higher cut-off frequencies, is schematically shown in FIG. 5.

The cut-off frequency $f_n$ of each filter n limits the maximal amount of times that a noiseless signal can cross a certain given reference level. This amount of times can be calculated or measured, and is determined by the doppler shift $f_D$ of the signal. It can in other words be said that each filter 414, 424 of the device 400 is adapted to a certain highest $f_D$.

The device 400 according to the invention adaptively chooses the output signal of the filter 414, 424, which is optimal at the moment, in other words that filter which best filters out noise and interference with a minimal effect on the useful signal. The choice can be made since each of the filters 414, 424 in the device according to the invention is connected to a corresponding level crossing counter, LCC, 434, 444 where $LCC_n$ counts the amounts of times which the output signal of the filter n in one direction, positive or negative, crosses the reference level used in the calculations according to expression (1).

All of the LCC's 434, 444 of the device are connected to a common decision device 454, a so-called selector block. The selector block 454 stores information regarding the above-mentioned threshold value for each LCC of the device.

As has been described above, the reference level is chosen using the average value of the received signal during the time of measurement. The threshold value used for the LCC's 434, 444 can vary if the ratio between the reference level and the average level of the received signal varies.

In the device 400 according to the invention, a threshold value for each filter is used, which is smaller than the maximum amount of times which a signal without interferences can cross a certain given reference level after the filter. How this threshold value is used will be explained in detail below.

In order to be able to choose the output signal of the filter 414, 424 which has the optimal threshold frequency for the signal received at the moment, the selector block 454 evaluates the values from the various LCC blocks 434, 444, starting with $LCC_0$. $LCC_0$ is, as has been explained above, connected to filter 0, which is the filter with the lowest cut-off frequency. If the value $LCC_0$ is less than the above-mentioned threshold value of filter 0, the value of $LCC_0$ is considered true.

If, however, the output value of $LCC_0$ exceeds the above-mentioned threshold value, the output signal of the filter connected to $LCC_0$ is considered to have too large an amount of level crossings. This means that the cut-off frequency $f_0$ of filter 0 is too low in relation to the received signal. The selector block 454 then evaluates the next LCC, which is repeated until an LCC is found whose output value is considered true, in other words is below the threshold value of the corresponding filter.

The amount of crossings which has been considered true is then used to calculate the speed of the cell phone, preferably using expressions (1) and (2) above.

It will here be realized that one of the reasons that the threshold values used are smaller than the maximal amount of crossings which can be obtained for each filter is that there is a desire to detect when the amount of crossings after a certain filter approaches a maximal value. The maximum value can, of course, by definition not be exceeded, and can thus not be detected.

In order to avoid minor fluctuations in the received signal causing level crossings, the LCC blocks 434, 444 are equipped with a so-called hysteresis function. This function means that after the received signal has crossed the reference level, the signal must reach a certain value from the reference level in order for the next crossing to be accepted. An example of a "hysteresis level" is shown in FIG. 3 by line $T_{hyst}$.

The fact that the threshold value, in other words the amount of crossing at which the selector block ceases to evaluate filter n and starts to evaluate filter n+1, is smaller than the maximal amount of crossings of filter n, also contributes to smooth transitions when the selector block 454 switches between the filters 414, 424. The principle behind this can be understood using FIG. 6, from which can also be seen the limiting effect of the cut-off frequencies of the various filters 414, 424 on the calculated doppler shift.

Figure 6:
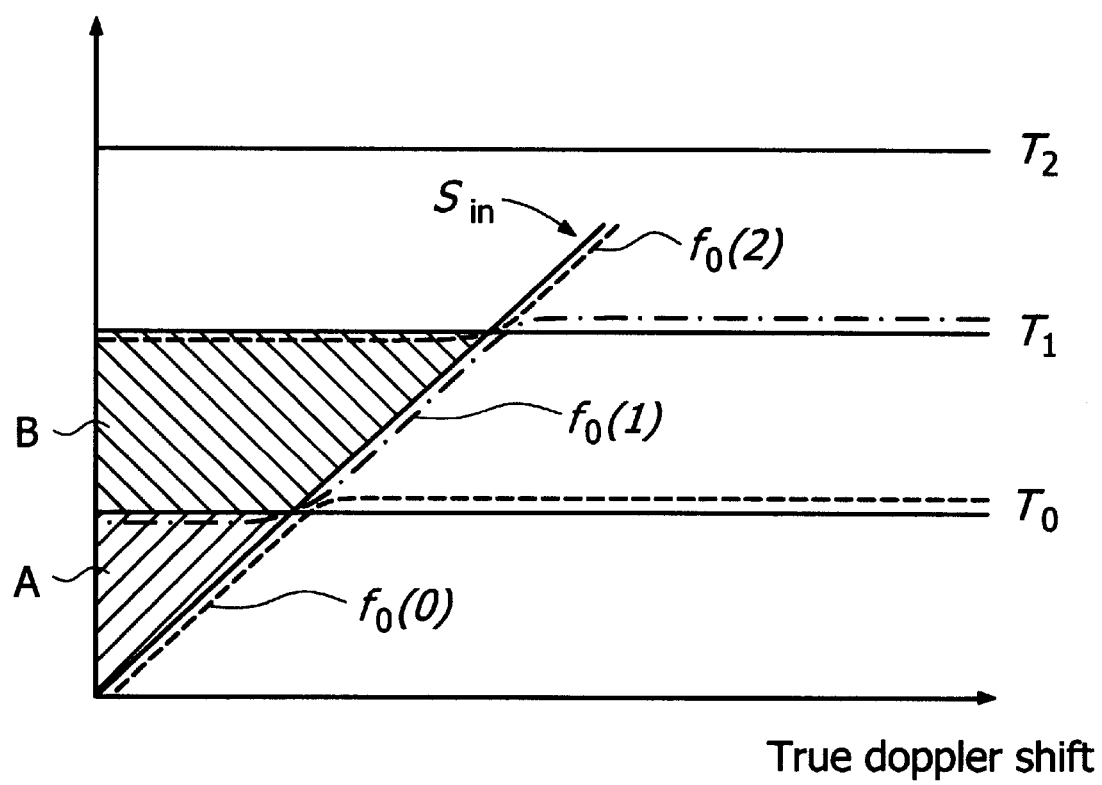
FIG. 6 shows the principle of different cut-off frequencies and overlaps.

FIG. 6 shows the calculated doppler shift of a received signal as a function of the true doppler shift of the received signal. The calculation of the doppler shift of the received signal is carried out using the output signals of the level crossing counters in a device according to the invention, in which the amount of filters and thus the amount of LCC's is three, LCC (0–2).

The in-signal $S_{in}$ is given a constantly increasing doppler shift $f_D$. The figure shows $f_D(0)$, $f_D(1)$ and $f_D(2)$, in other words the calculated doppler shifts which are obtained using the values of LCC (0–2).

From the figure it can be seen that $f_D(0)$ corresponds well to the doppler shift of the in-signal up to a certain level which is caused by the cut-off frequency for filter 0, $f_0$.

For signals whose doppler shift is above this level, the plot of $f_D(0)$ will essentially be constant.

In a corresponding manner, $f_D(1)$ follows the doppler shift of the input signal up to a higher level. Since the cut-off frequency of the filter 1 is higher, the output signal of the filter 1 will however possibly vary greatly at low $f_D$, depending on the current level of noise and other disturbances. This is shown by the shaded area A, within which $f_D(1)$ will vary depending on the level of disturbances.

In the same manner, $f_D(2)$ follows the doppler shift of the in-signal up to a higher level, but $f_D(2)$ will also be able to vary within a larger area, in other words the sum of the shaded areas A and B.

FIG. 6 also shows, with horizontal lines, the threshold values $T_0$, $T_1$ and $T_2$. The threshold value $T_n$ is the threshold value at which the decision device 454 stops using values from $LCC_n$ and starts using values from $LCC_{n+1}$. As can be seen from the picture, these threshold values $T_n$ are chosen to be smaller than the values which the output signal from the filters will assume when the output signal stops being essentially linear and starts being essentially constant.

The invention is not limited to the above described examples of embodiments, but can be varied within the scope of the appended claims. For example, a device according to the invention does not need to use a hysteresis level.

Additionally, the limit where the transition between the evaluation of the two subsequent filters takes place can be chosen arbitrarily. The invention can furthermore be used in other applications than cellular telephony in which there is a need to distinguish a weak input signal from noise and other interference.

The filters 414, 424 used in the device can be designed according to a variety of principles, and can be designed in various combinations of software and hardware. Since the principles of filter design are well known to those skilled in the field, the design of the filters has not been described in detail here.

What is claimed is:

1. A device for calculating a velocity of a moving transmitter using Rayleigh-fading of a received radio signal, the device comprising:

at least first means including at least one filter and at least one level crossing counter for calculating at least a first value using the received radio signal;

at least second means including at least one filter and at least one level crossing counter for calculating at least a second value using the received radio signal; and a common decision device coupled to the at least first and at least second means;

wherein the common decision device is arranged to choose an optimal value for calculating the velocity of the moving transmitter from among the at least first value and the at least second value.

2. The device according to claim 1, wherein the at least one filter in the at least first means and the at least one filter in the at least second means are low-pass filters having different cutoff frequencies, the at least one filter of the first means having a lower cut-off frequency than the at least one filter of the second means.

3. The device according to claim 1, wherein the received radio signal is used as input signal for each of the filters of the device;

an output signal from each of the filters of the device is used as input signal to a respective level crossing counter of the device; and output signals of the level crossing counters are used as input signals to the common decision device.

4. The device according to claim 1, wherein the common decision device comprises:

means for comparing an output signal of the at least one level crossing counter of the first means with a predetermined threshold value for that level crossing counter;

means for accepting the output signal of the at least one level crossing counter of the first means if the predetermined threshold value is not exceeded; and if the predetermined threshold value is exceeded, means for comparing in rising order an output signal of each the at least one level crossing counters with a predetermined threshold value for each respective level crossing counter, and means for accepting a first output signal that does not exceed the predetermined threshold value for a corresponding level crossing counter.

5. The device according to claim 1, wherein the level crossing counters include a hysteresis function.

6. The device according to claim 1, further comprising a calculation device arranged to calculate the velocity of movement of the transmitter using an accepted output signal from one of the level crossing counters.

7. A method for calculating a velocity of a moving transmitter using Rayleigh-fading of a received radio signal, the method comprising the steps of:

making at least two parallel calculations of at least two respective values using the received radio signal;

using the at least two respective values resulting from the parallel calculations as the basis for making a decision; and choosing an optimal value for calculating the velocity of the moving transmitter from among the at least two respective values;

wherein each of the at least two parallel calculations is carried out by respective means each having at least one filter and at least one level crossing counter.

8. The method according to claim 7, wherein each of the filters used in the calculations are low-pass filters having different cut-off frequencies.

9. The method according to claim 7, wherein the received radio signal is used as input signal for each of the filters of the device;

an output signal from each filter in the device is used as input signal to a respective level crossing counter of the device; and output signals of the level crossing counters are used as input signals to a decision device.

10. The method according to claim 9, wherein the decision device is arranged to carry out the following steps:

comparing an output signal of a level crossing counter coupled to a filter having a lowest cut-off frequency to a predetermined threshold value for that level crossing counter;

accepting the output signal of the level crossing counter coupled to the filter having the lowest cut-off frequency if the predetermined threshold value is not exceeded; and if the predetermined threshold value is exceeded, comparing the output signal of each level crossing counter in rising order with respect to the cut-off frequencies of the filters coupled to the respective level crossing counters to a predetermined threshold value for each level crossing counter, and accepting a first output signal which does not exceed the predetermined threshold value for each respective level crossing detector.

11. The method according to claim 7, wherein the level crossing counters comprise a hysteresis function.

12. The method according to claim 7, further comprising the step of calculating a velocity of movement using an accepted output signal from one of the level crossing detectors.

* * * * *